United States Patent [19]

Leistner et al.

[11] 4,346,025
[45] Aug. 24, 1982

[54] STABILIZED VINYL CHLORIDE POLYMER COMPRISING A PHENYLETHYLIDENE ARYL PHOSPHITE

[75] Inventors: William E. Leistner, New York, N.Y.; Motonobu Minagawa, Koshigaya, Japan; Yutaka Nakahara, Iwatsuki, Japan; Kazumi Kitsukawa, Misato, Japan

[73] Assignee: Adeka Argus Chemical Co., Ltd., Urawa, Japan

[21] Appl. No.: 119,547

[22] Filed: Feb. 7, 1980

[30] Foreign Application Priority Data

Feb. 7, 1979 [JP] Japan ................... 54-13501

[51] Int. Cl.$^3$ .................. C08K 5/52; C09K 15/32
[52] U.S. Cl. .................. 524/141; 252/400 A; 252/400 R; 524/178; 524/327; 524/329; 524/399; 524/400; 524/567
[58] Field of Search .......... 252/400 A; 260/45.7 PH, 260/23 XA

[56] References Cited

U.S. PATENT DOCUMENTS

| | | | |
|---|---|---|---|
| 2,220,845 | 11/1940 | Moyle | 260/967 |
| 2,564,646 | 8/1951 | Leistner et al. | 260/45.7 PH |
| 2,867,594 | 1/1959 | Hansen et al. | 260/45.7 PH |
| 2,997,454 | 8/1961 | Leistner et al. | 260/45.7 PH |
| 3,231,531 | 1/1966 | Buckley et al. | 260/23 XA |
| 3,244,661 | 4/1966 | Kline | 260/45.7 PH |
| 3,382,199 | 5/1968 | Scullin | 260/45.7 PH |
| 3,697,463 | 10/1972 | Oakes et al. | 260/45.7 PH |
| 4,233,208 | 11/1980 | Spivack | 260/45.7 PH |

*Primary Examiner*—John Kight, III
*Assistant Examiner*—R. A. White

[57] ABSTRACT

A stabilizer composition is disclosed that enhances the resistance to deterioration upon heating of vinyl chloride polymers. The stabilizer composition comprises (A) a metal salt of a nitrogen-free monocarboxylic acid or a phenol and (B) a hydrogen phosphite ester of an ortho-phenylethylidene-substituted phenol.

Vinyl chloride polymer compositions stabilized with the above disclosed stabilizer composition are also disclosed.

12 Claims, No Drawings

STABILIZED VINYL CHLORIDE POLYMER COMPRISING A PHENYLETHYLIDENE ARYL PHOSPHITE

BACKGROUND OF THE INVENTION

This invention relates to a new stabilizer composition for enhancing the resistance to deterioration upon heating of vinyl chloride polymers, and to vinyl chloride polymers having enhanced resistance to deterioration in initial color, heat stability and clarity as a result of incorporating therein a stabilizer composition according to this invention.

The voluminous patent and other literature on the stabilization of vinyl chlorde polymers has been recently summarized by M. Minagawa in U.S. Pat. No. 4,134,868 of Jan. 16, 1979: the portion of this patent from column 1 line 13 to column 2 line 4 here incorporated by reference, can be consulted for a recitation of important heat stabilizers found in commercial use and a list of pertinent review articles.

W. Leistner in U.S. Pat. No. 2,564,646 of Aug. 14, 1951 disclosed vinyl chloride polymer compositions containing polyvalent metal carboxylate stabilizers together with an alkyl or aryl phosphite anti-clouding agent, and in U.S. Pat. No. 2,716,092 of Aug. 23, 1955 disclosed the use of hydrocarbon-substituted phenol metal salts in vinyl chloride polymer stabilizers along with metal carboxylates and organic phosphites.

Additional representative disclosures of organic esters of phosphorous acid used in vinyl chloride polymer stabilizers are by F. Hansen in U.S. Pat. No. 2,867,594 of Jan. 6, 1959, J. Darby in U.S. Pat. No. 2,951,052 of Aug. 30, 1960, L. Friedman in U.S. Pat. No. ,3047,608 of July 31, 1962, R. Buckley in U.S. Pat. No. 3,342,767 of Sept. 19, 1967, J. Scullin in U.S. Pat. No. 3,202,622 of Aug. 24, 1965, and T. Sekiguchi in U.S. Pat. No. 4,105,627 of Aug. 8, 1978.

W. Leistner in U.S. Pat. No. 2,997,454 of Aug. 22, 1961 disclosed polyvinyl chloride compositions of excellent initial color stabilized with a combination of an organic triphosphite with a heavy metal fatty acid salt to which there is added a phosphorus compound having at least one hydrogen atom of acidic character. The phosphorus acids in Leistner's compositions are defined by the formula:

In this formula, phosphorus has a valence of three or five, the additional two valences being indicated by dotted line bonds. Typical phosphorus acids coming within this general formula are the following:

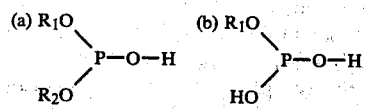

Acid esters of phosphorus acid

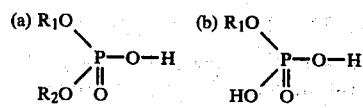

Acid esters of phosphoric acid

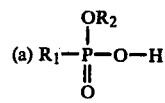

Acid esters phosphonic acids

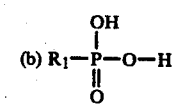

Phosphonic acids

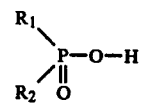

Phosphinic acids

Phosphorous acid

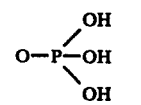

Phosphoric acid

Metaphosphoric acid

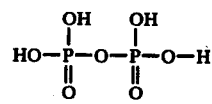

Pyrophosphoric acid

In the above formulae $R_1$ and $R_2$ represent an organic aliphatic, aromatic or nonaromatic alicyclic hydrocarbon or heterocyclic radical having from one to about thirty carbon atoms. $R_1$ and $R_2$ in I, II, III(a) and IV may be the same or different.

In the above formulae. $R_1$ and $R_2$ represent an organic aliphatic, aromatic or nonaromatic alicyclic hydrocarbon or heterocyclic radical having from one to about thirty carbon atoms. $R_1$ and $R_2$ in I, II, III (a) and IV may be the same or different.

R. Kline in U.S. Pat. No. 3,244,661 of Apr. 5, 1966 disclosed triaryl phosphite rubber stabilizers in which each aromatic ring contains one benzyl or alpha-methyl-benzyl substituent and wherein the aromatic rings may each be further substituted with one or more lower alkyl substituents. Kline's triaryl phosphites are represented by the formula

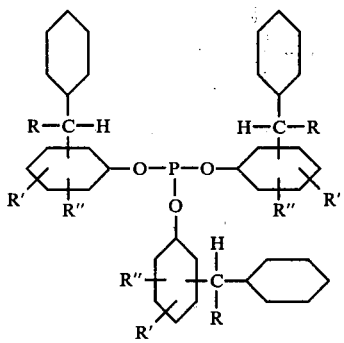

in which R is a hydrogen atom or methyl radical and R' and R" are hydrogen or lower alkyl radicals containing from 1 to 5 carbon atoms.

A. Shepard in U.S. Pat. No. 3,281,506 of Oct. 25, 1966 disclosed a class of secondary aryl phosphite antioxidants, stabilizers, and plasticizers which have the general formula

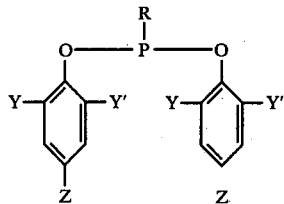

wherein R is selected from the group consisting of a hydroxyl and halogen radicals, Y and Y' are organic radicals containing at least four carbon atoms, and Z is selected from the group consisting of hydrogen, a halogen and an organic radical.

The Y and Y' organic radicals are further characterized as alkyl having from 4 to 12 carbon atoms and aralkyl having from 7 to 12 carbon atoms; however, no specific phosphite in which Y or Y' are aralkyl groups is disclosed.

R. Harrington, Jr. in U.S. Pat. No. 3,274,014 of Sept. 20, 1966 disclosed yarn compositions of synthetic fibers having incorporated a small amount of a metal monoalkyl or monoaryl phosphate, metal dialkyl phosphate, metal alkyl phosphonate, metal alkyl (alkyl phosphonate) or metal dialkylphosphite are resistant to ultraviolet light. Examples show among others yarns spun from dopes of modified vinylidene chloride-acrylonitrile copolymer containing zinc diethyl phosphite.

G. Juredine in U.S. Pat. No. 3,284,386 of Nov. 8, 1966 disclosed organic metallophosphite stabilizers for vinyl chloride polymers represented by the formula

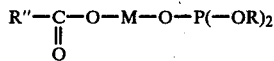

in which M can be barium, calcium, and strontium and R and R" can be alkyl- groups, cycloaliphatic groups, aryl groups, aralkyl groups, alkaryl groups, and their halo substituted derivatives, R having from 4 to 18 and R" from 3 to 17 carbon atoms.

F. Kujawa in U.S. Pat. No. 3,412,118 of Nov. 19, 1968 disclosed phosphorous acid monoesters of 2,6-disubstituted and 2,4,6-trisubstituted phenols and their metal salts. Kujawa's monoesters have the formula

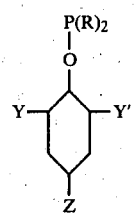

wherein R is selected from the group consisting of hydroxyl and halogen radicals, Y and Y' are organic radicals containing at least four carbon atoms, and Z is selected from the group consisting of hydrogen, halogen, and organic radicals containing at least four carbon atoms.

The metal salts of the primary aryl phosphites of this invention have the formulas:

$$\left(\begin{array}{c} O\!\!-\!\!X \\ P \\ O\;\;OH \\ Y\!\!-\!\!\bigcirc\!\!-\!\!Y' \\ Z \end{array}\right)_n \quad\text{or}\quad \left(\begin{array}{c} O\!\!-\!\!X \\ P\!\!\rightarrow\!\!O \\ O\;\;H \\ Y\!\!-\!\!\bigcirc\!\!-\!\!Y' \\ Z \end{array}\right)_n$$

(A)      (B)

wherein Y and Y' are organic radicals containing at least four carbon atoms, Z is selected from the group consisting of hydrogen, halogen, and organic radicals containing at least four carbon atoms, X is selected from the group consisting of ammonium, substituted ammonium and metals, and n is an integer from 1 to 4 representing the valence of X. Two formulas have been illustrated to show that two forms of primary phosphites are believed to exist. However, Formula A will be used throughout this application as the presently preferred form.

In Kujawa metal salts, the molar ratio of phosphorous acid monoester groups to metal atoms is equal to the valence of the metal, so that for bivalent metals Kujawa teaches only salts in which there are two phosphorous acid monoester groups for each metal atom.

Kujawa points out prior art "primary aryl phosphites, including the corresponding salts, are too unstable to moisture to permit their general usage", while his aryl phosphites and salts are stable. Ouchi Shinko in Japanese patent publication No. 23,061/75 of Aug. 5, 1975 abstracted in Chemical Abstracts 1976, volume 84, no. 18571f, disclosed stabilizer combinations containing a tris (styrenated phenyl) phosphite of the type disclosed by R. Kline and styrenated phenol for polymers such as polyvinyl chloride and polyformaldehyde.

SUMMARY OF THE INVENTION

In accordance with this invention, a vinyl chloride polymer composition having enhanced resistance to deterioration in color and clarity, when weathered or heated at 175° C. comprises a vinyl chloride polymer and 0.01 to 10 parts by weight (per 100 parts of vinyl chloride polymer) of a stabilizer composition comprising (A) at least one metal salt of a monohydric phenol having 6 to 30 carbon atoms or of a nitrogen free monocarboxylic acid having 6 to 24 carbon atoms, the metal being any one or more of antimony, an alkali metal having an atomic weight less than 50, a Group II metal having an atomic weight between 20 and 150, or a Group IV metal having an atomic weight between 80 and 220; and (B) at least one hydrogen phosphite ester of an ortho-phenylethylidene-substituted phenol having linked to phosphorus through oxygen at least one ortho-phenylethylidene substituted phenyl group which can be additionally substituted with one or two aliphatic or aromatic hydrocarbon groups, and a second group which can be an ortho-phenylethylidene substituted phenyl group; an alkyl, aryl, alkaryl, or aralkyl group; or an ether-linked alkyl or aryl group; or a hydrogen atom. The ratio of metal phenol or carboxylic acid salt to hydrogen phosphite ester in the stabilizer composition is preferably within the range from 10:1 to 1:10.

The hydrogen phosphite ester can be represented by the formula (I)

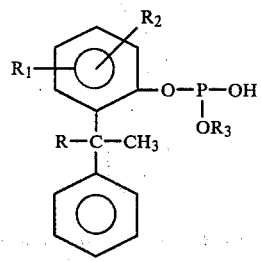

in which R is hydrogen or methyl, each of $R_1$ and $R_2$ independently is a hydrogen atom, an alkyl group, an aryl group, or an aralkyl group; and $R_3$ is a hydrogen atom, an alkyl, cycloalkyl, aryl, alkaryl, or aralkyl group, or an ether-linked alkyl or aryl group.

DESCRIPTION OF PREFERRED EMBODIMENTS

The metal carboxylic acid or phenol salt component of the stabilizer is preferably a salt of a metal such as antimony, barium, cadmium, lead, calcium, magnesium, strontium, stannous tin, and zinc. Four-valent tin with two of the four valences linked through carbon to alkyl groups, i.e. dialkyltin salts such as dimethyltin, di-n-butyltin, di-isobutyltin, di-2-ethylhexyltin and di-n-octyltin carboxylates and substituted phenolates, are also among the preferred metal salts in the stabilizer composition according to this invention. In the salt, the acid can be any mono-carboxylic acid free of nitrogen having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen containing heterocyclic compounds can be aromatic or non aromatic and can include oxygen and carbon in the ring structure, such as alkyl substituted furoic acid. The aromatic acids likewise can have non-reactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, sorbic acid, n-octoic acid, isooctoic acid, 3,5,5,-trimethyl hexoic acid, pelargonic acid, capric acid, neodecanoic acid, undecylenic acid, lauric acid, myristic acid, isodecanoic acid, palmitic acid, isostearic acid, stearic acid, oleic acid, ricinoleic acid, erucic acid, behenic acid, chlorocaproic acid, 12-hydroxy stearic acid, 12-ketostearic acid, phenyl stearic acid, benzoic acid, phenylacetic acid, p-t-butylbenzoic acid, ethylbenzoic acid, isopropylbenzoic acid, bromobenzoic acid, salicylic acid, naphthoic acid, 1-naphthalene-acetic, orthobenzoyl benzoic acid, 5-t-octylsalicylic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

In combination with the above metal salts of organic acids, or in lieu thereof, a metal salt of an optionally hydrocarbon-substituted phenol can be used. The hydrocarbon substituents contain from one to twenty-four carbon atoms each. The metal can be an alkali metal or alkaline earth metal such as sodium, potassium, lithium, calcium, strontium, magnesium, and barium. Among such polyvalent metal phenolates there can be mentioned the magnesium, barium, calcium, strontium, tin and zinc salts of phenol, ethylphenol, cresol, xylenol, butyl phenol, isoamyl phenol, isooctyl phenol, 2-ethylhexyl phenol, t-nonylphenol, n-decyl phenol, t-dodecyl phenol, t-octyl phenol, isohexyl phenol, octadecyl phenol, diisobutyl phenol, methyl propyl phenol, diamyl phenol, methyl isohexyl pheno, methyl t-octyl phenol, di-t-nonyl phenol, ortho or para phenyl phenol. The metal phenolate should be compatible with the halogen-containing resin.

Mixtures of salts of various metals can be used, and many such mixtures are known to give enhanced effects, such as mixed zinc and tin salts with the alkaline earth metal salts, e.g. barium and zinc stearates, as in U.S. Pat. No. 2,446,976.

In the ortho-phenylethylidene-substituted phenyl hydrogen phosphite ester according to this invention, aromatic hydrocarbon groups occuring at $R_1R_2$ or $R_3$ include phenyl and preferably groups having 7 or more carbon atoms such as 1-naphthyl, 2-naphthyl, tolyl, xylyl, ethylphenyl, butylphenyl, t-butylphenyl, octylphenyl, isooctylphenyl, nonylphenyl, 2,4-di-t-butylphenyl, p-dodecylphenyl, didodecylphenyl, cyclohexylphenyl, dicyclohexylphenyl, benzyl, 1-phenylethyl, 2-phenylethyl, 3-phenylpropyl 7-phenylheptyl, p-pentadecylbenzyl, and trimethylbenzyl. Any of these groups can occur at one or more of $R_1$ $R_2$ and $R_3$ in formula I. It is particularly preferred for $R_1$ to represent a phenylethylidene group of formula (II).

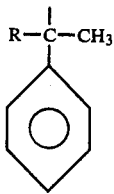

and for $R_3$ to represent a phenylethylidene substituted phenyl group of formula III.

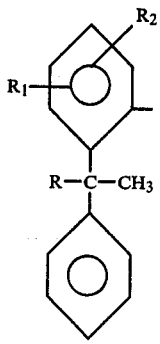

Aliphatic hydrocarbon groups include methyl, ethyl, propyl, isopropyl, butyl, isobutyl, t-butyl, s-butyl, amyl, neopentyl, isoamyl, hexyl, decyl, isodecyl, lauryl, tridecyl, $C_{12-15}$ mixed alkyl, stearyl, eicosyl, dodosyl, triacontanyl, allyl, methallyl, and oleyl; instead of aliphatic hydrocarbon there can occur ether-linked aliphatic and aromatic groups such as 2-methoxyethyl, 2-ethoxyethyl, 2-isopropoxyethyl, 2-butoxyethyl, 2-isobutoxyethyl, 2 hexyloxyethyl, 2-cyclohexyloxyethyl, 2 phenoxyethyl, 2(2'-methoxyethoxy)ethyl, 2(2'-butoxyethoxy) ethyl, 2(2'-butoxyethoxy)ethyl, 2(2'-isobutoxyethoxy)ethyl, and residue of triethylene glycol monoethylether, -monobutylether, or residue of glycerin-1,2-dimethyl ether, -1,3-dimethylether, -1,3-diethylether, -1-ethyl-2-propylether, or nonylphenoxypolyethoxyethyl, and lauroxypolyethoxyethyl.

Cycloaliphatic $R_3$ groups include cyclopentyl, cyclohexyl, methylcyclopentyl, dimethylcyclobutyl, 4-methylcyclohexyl, 4-t-butylcyclohexyl, cyclooctyl, cyclododecyl, 1,2,3,4-tetrahydro-2-naphthyl, decahydro-1-naphthyl, hydrodicyclopentadienyl, cholesteryl, and dehydroabietyl.

Ortho phenylethylidene substituted phenyl hydrogen phosphite stabilizers of this invention are conveniently prepared by any of several methods. For example a mono(orthophenylethylidene substituted phenyl) phosphite such as o-(1-methyl-1-phenylethylidene)phenyl phosphite can be prepared by the hydrolysis under mild conditions of o-(1-methyl-1-phenylethylidene) phenylphosphorodichloridite o-$C_6H_5C(CH_3)_2C_6H_4OPCl_2$ which is obtained by heating o(1-methyl-1-phenylethylidene phenol with a 100–300% excess of phosphorus tirchloride and stripping the unreacted excess. A bis(orthophenylethylidene substituted phenyl) phosphite such as bis(2,4-di-(1-methyl-1-phenylethylidene phenyl) phosphite can be prepared by transesterification of diphenyl phosphite with 2 moles of the orthophenylethylidene substituted phenol at 130°–150° C. with subsequent removal of the generated phenol by vacuum distillation. When only one mole of the orthophenylethylidene substituted phenol is used per mole of diphenyl phosphite, the unsymmetrical phenyl 2,4-di(1-methyl-1-phenylethylidene)phenyl phosphite is obtained. The latter can serve as starting material for the preparation of unsymmetrical alkyl or ether-interrupted alkyl ortho-phenylethylidene substituted phenyl phosphites by selective transesterification with an alcohol or ether-alcohol in which the displacement of the unsubstituted phenyl group is favored, suitably by heating at 100°–125° C. for several hours and then stripping phenol.

The chemical reactions taking place in these preparations can be summarized by the following equations, in which for convenience Ar is used to symbolize the orthophenylethylidene substituted phenyl group

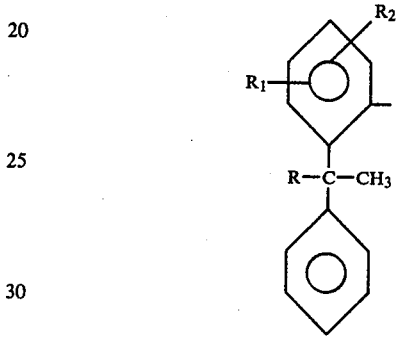

in which $R_1$, $R_2$, and R are as previously defined.

A. $ArOH + PCl_3 \xrightarrow{\text{excess } PCl_3} ArOPCl_2 + HCl$ $ArOPCl_2 + 2 H_2O \rightarrow ArOP(OH)_2 + HCl$ B. $2 ArOH + HOP(OC_6H_5)_2 \rightarrow (ArO)_2POH + 2 C_6H_5OH$ C. $ArOH + HOP(OC_6H_5)_2 \rightarrow ArO(C_6H_5O)POH + C_6H_5OH$ D. $ArO(C_6H_5O)POH + C_4H_9OCH_2CH_2OH \rightarrow ArO(C_4H_9OCH_2CH_2O)POH + C_6H_5OH$ Typical ortho-phenylethylidene substituted phenyl hydrogen phosphites of formula 1 that can be used in the stabilizer composition of this invention and prepared by one or more of the chemical reactions summarized above are shown by name and formula in Table 1. An alternative nomenclature is used, in which the 1-phenylethylidene group is referred to as methylbenzyl and the 1-methyl-1-phenylethylidene group is referred to as dimethylbenzyl. The symbol X is used to indicate a t-butyl group.

TABLE 1

1. 2(Methylbenzyl)phenyl 2-t-butylphenyl phosphite

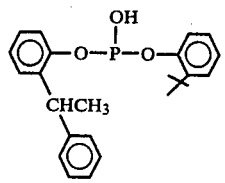

2. Bis(2-methylbenzylphenyl) phosphite

TABLE 1-continued

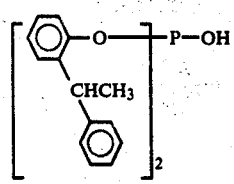

3. 4-Methyl-2(methylbenzyl)phenyl 2,4-di-t-butylphenyl phosphite

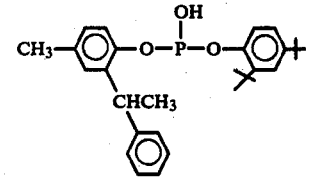

4. 4-t-Butyl-2(methylbenzyl)phenyl phenyl phosphite

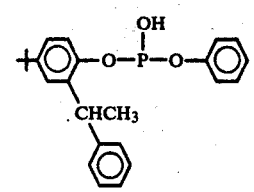

5. 2,4-Bis(methylbenzyl)phenyl 2-t-butylphenyl phosphite

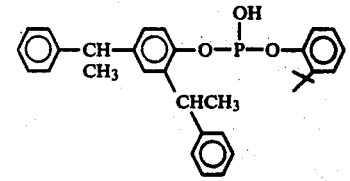

6. 4-Isoamyl-2(methylbenzyl)phenyl 2-t-butyl-4-methylphenyl phosphite

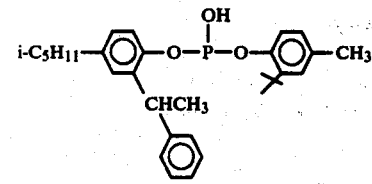

7. 2-(Methylbenzyl)-4-phenylphenyl nonylphenyl phosphite

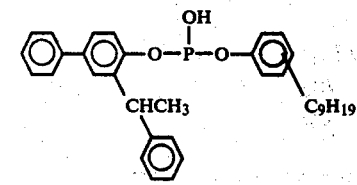

8. 2,4-Bis(dimethylbenzyl)phenyl isodecyl phosphite

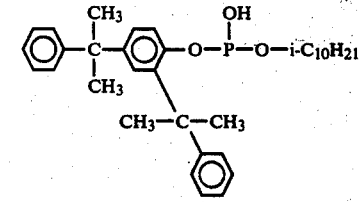

9. 4-Isopropyl-2(methylbenzyl)phenyl 2(2′-butoxyethoxy)ethyl phosphite

TABLE 1-continued

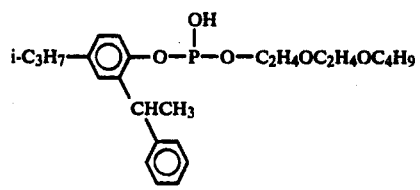

10. 4,5-Dimethyl-2(methylbenzyl)phenyl 2,4-di-t-butylphenyl phosphite

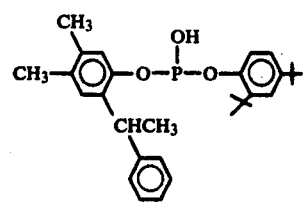

11. 5-t-Butyl-2(methylbenzyl)phenyl 2-cyclohexylphenyl phosphite

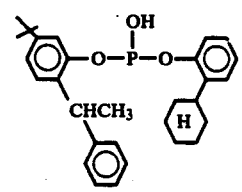

12. 4-Ethyl-2(methylbenzyl)phenyl 2,4-di-t-amylphenyl phosphite

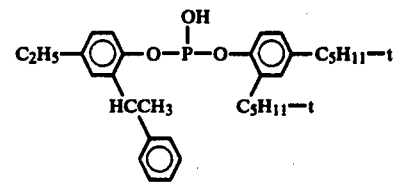

13. 2(Dimethylbenzyl)phenyl 2,4-di-t-butylphenyl phosphite

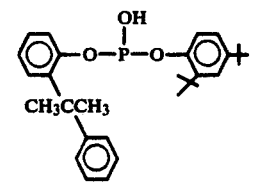

14. 4-Amyl-2(dimethylbenzyl)phenyl phenyl phosphite

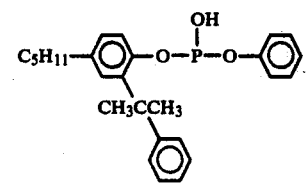

15. 4-Methyl-2(dimethylbenzyl)phenyl alkyl (mixed C12-C15) phosphite

TABLE 1-continued

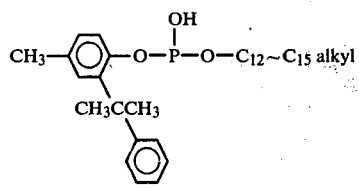

16. 2(Dimethylbenzyl)phenyl 2,4-di-t-butyl-5-methylphenyl phosphite

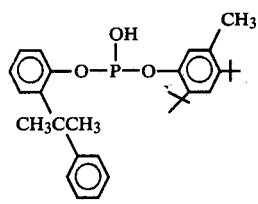

17. 4-Butyl-2(dimethylbenzyl)phenyl 2-t-butylphenyl phosphite

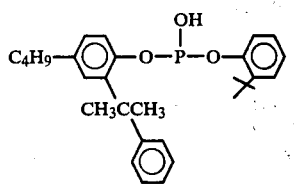

18. 2,4-Bis(methylbenzyl-5-methylphenyl tridecyl phosphite

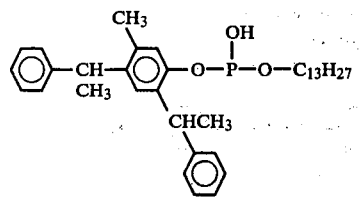

19. 6-Isopropyl-2(dimethylbenzyl)phenyl 2,4-d-t-butyl-6-methylphenyl phosphite

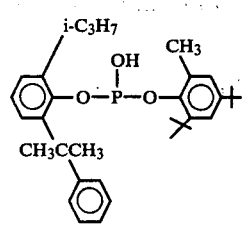

20. 4,6-Dimethyl-2(methylbenzyl)phenyl octyl phosphite

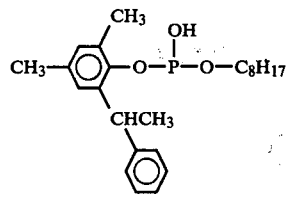

21. 5-t-Butyl-2(dimethylbenzyl)phenyl 2-phenoxyethyl phosphite

TABLE 1-continued

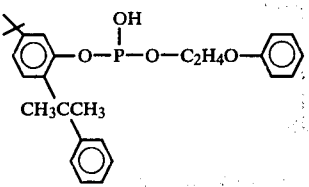

22. Bis 2(dimethylbenzyl)phenyl phosphite

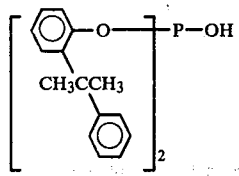

23. 4-Phenyl-2(dimethylbenzyl)phenyl benzyl phosphite

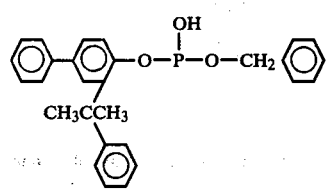

24. 4,6-Di-t-butyl(dimethylbenzyl)phenyl nonylphenyl phosphite

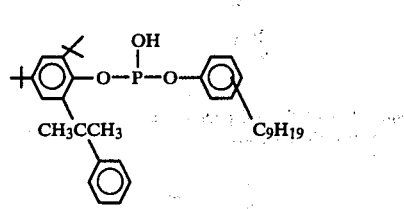

25. 4-Methyl-2-(methylbenzyl)phenyl 2,4-di-t-butyl-6-methylphenyl phosphite

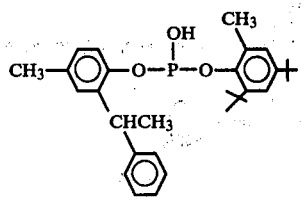

26. 2(Methylbenzyl)phenyl tridecyl phosphite

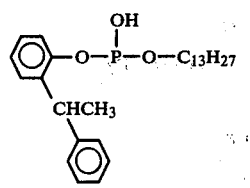

27. 6-t-Amyl-2(dimethylbenzyl)phenyl 2-t-butylphenyl phosphite

TABLE 1-continued

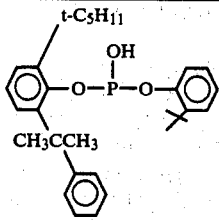

28. 2,4-Bis(methylbenzyl)phenyl isodecyl phosphite

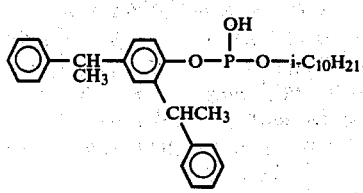

The following Synthesis Examples illustrate, without limiting, the preparation of ortho-phenylethylidene substituted phenyl hydrogen phosphites according to this invention.

SYNTHESIS EXAMPLE 1

Preparation of bis(o-1-phenylethylidenephenyl) phosphite, Table 1 compound No. 2

A mixture of 234 g diphenylphosphite and 396 g o-1-phenylethylidene phenol was stirred and heated for 4 hours and 140°–150° C. at atmospheric pressure, after which the pressure was gradually reduced to 15 min. and the phenol produced by the reaction was allowed to distil from the mixture. There resulted 414 g of a pale yellow oily liquid of bis(o-1-phenylethylidene phenyl)-phosphite.

SYNTHESIS EXAMPLE 2

Bis(o-1-methyl-1-phenylethylidenephenyl)phosphite, Table 1 Compound No. 2

Diphenyl phosphite and o-1-methyl-1-phenylethlidenephenol heated, stirred, and distilled as in Synthesis Example 1 gave bis(1-methyl-1-phenylethylidenephenyl) phosphite as a viscous oil that set to a glass on keeping at 25° C.

SYNTHESIS EXAMPLE 3

Isodecyl 2,4-bis(1-methyl-1-phenylethylidene) phenyl phosphite, Table 1 compound No. 8

A mixture of 234 g diphenyl phosphite and 330 g 2,4-bis(1-methyl-1-phenylethylidene)phenol was stirred and heated for 4 hours at 110°–120° C. and then stripped of phenol under reduced pressure. Isodecyl alcohol 158 g was added and the operation of heating and stripping repeated to give 521 g of isodecyl 2,4-bis(1-methyl-1-phenylethylidene) phenyl phosphite as a pale yellow oily liquid.

The stabilizer composition of this invention are suitably used in concentrations that provide per 100 parts by weight of the vinyl chloride polymer 0.01 to 5 parts by weight, preferably 0.05 to 2 parts by weight, of the ortho-phenylethylidene substituted phenyl phosphite of this invention.

Together with the stabilizer composition of this invention there can be used if desired known polymer stabilizers, plasticizers such as esters of phthalic, adipic, azelaic, sebacic, and trimellitic acids, and other useful additives as needed.

Such additives include pigments, fillers, blowing agents, antistatic agents, anti-fogging agents, infrared absorbers, anti-plating agents, surface treatment agents, lubricants, fire retardants, fluorescent agents, fungicides, bactericides, heavy metal deactivators, photodegradation agents, boric acid esters, thiourea derivatives, processing aids, parting agents, reinforcing agents and the like.

The stabilizer composition of this invention is applicable to any vinyl chloride polymer. The term "vinyl chloride polymer" as used herein is inclusive of any polymer formed at least in part of the recurring group,

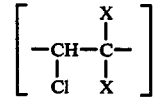

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with acrylonitrile, 1-butene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

The stabilizer combinations of this invention are effective in improving initial color and heat stability of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers, provide greatly improved resistance to heat degradation not obtainable with the other heat stabilizers alone.

The stabilizer composition of this invention shows synergistic interaction and provides improved effectiveness when used together with certain known useful additives, including 1,2-epoxides, phenols, organic phosphites, the esters, amides, and hydrazides of thiodialkylenedicarboxylic acids 3-aminocrotonic acid, and nitrilotrialkylenetricarboxylic acids, ketoacetic acid compounds, aliphatic polyhydric alcohols having 3 to 8 alcoholic hydroxyl groups, aliphatic and aromatic beta-diketones, ultraviolet absorbers and alkyl or polyether alcohol esters of phosphoric acid.

Phenol stabilizers can be included with the stabilizer composition of this invention in amounts corresponding to 0.01 to about 0.2 parts per parts of polymer being stabilized. Typical phenol stabilizers are butylated hydroxy-toluene (BHT), 4,4'-isopropylidenebisphenol, and 1,1,3-tris(2'methyl-4'-hydroxy-5'-t-butylphenyl)butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tripentaerythritol, mannitol, sorbitol, and partial esters of these with saturated and unsaturated fatty acids having 6 to 22 carbon atoms.

Ultraviolet absorbers, typically derivatives of 2-hydroxybenzophenone or of 2(2'-hydroxyphenyl)benzo-1.2.3-triazole, can be included with the stabilizer composition of this invention in amounts corresponding to 0.05 to about 0.5 parts per 100 parts of polymer being stabilized. A specific disclosure of ultraviolet absorbers by W. Leistner in U.S. Pat. No. 4,174,297, column 14 line 59 to column 15 line 2 is here incorporated by reference.

Organic phosphite stabilizers can be included with the stabilizer composition of this invention in amounts corresponding to 0.05 to about 2 parts by weight per 100 parts by weight of polymer being stabilized. Typical phosphite stabilizers are triphenyl phosphite, diphenyl phosphite, tris(nonylphenyl) phosphite, 2-ethylhexyl diphenyl phosphite, diisodecyl phenyl phosphite, trinonyl phosphite, and pentaerythritol bis(n-octadecyl phosphite). The phosphite stabilizer can have one or a plurality of phosphite ester groups and from 10 to about 75 carbon atoms. A comprehensive disclosure of organic phosphite stabilizers at column 13 line 63 to column 15 line 48 of M. Minagawa U.S. Pat. No. 3,849,370 is here incorporated by reference.

Oxirane or 1,2-epoxide stabilizers can be included with the stabilizer composition of this invention in amounts corresponding to 0.2 to about 20 parts by weight per 100 parts by weight of polymer being stabilized. Typical 1,2-epoxide stabilizers are epoxidized polybutadiene, epoxysoybean oil, epoxylinseed oil, and 2-ethylhexyl epoxystearate. The epoxide stabilizer can have one or a plurality of oxirane or 1,2-epoxide groups and from 15 to 150 carbon atoms. A comprehensive disclosure of epoxide stabilizers at column 26 lines 12 to 40 and column 27 lines 17 to 51 of M. Minagawa U.S. Pat. No. 3,869,423 is here incorporated by reference.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris(ethylamide), NTA bis(hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Ketoacetic acid compounds that can be used with the stabilizer compositions of this invention in amounts of about 0.05 to about 0.5 parts per 100 parts of polymer being stabilized include 2-ethylhexyl acetoacetate, glyceryl tris(acetoacetate) and dehydroacetic acid. A comprehensive disclosure of ketoacetic acid compounds that can be used from column 2 line 32 to column 5 line 10 of U.S. Pat. No. 3,346,536 issued Oct. 10, 1967 is here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2'thiodiethyl 3-aminocrotonate; thiocarbanilide and 2-phenylindole, 1,3-dibutylthiourea, phenylurea, and p-ethoxyphenylurea.

Betadiketones also called 1,3-diketones, or diacylmethanes have two to three acyl groups linked to a single carbon atom. The acyl groups can be aromatic, cycloaliphatic, or aliphatic, and preferably have from 2 to 30 carbon atoms. Using the diacylmethane system of nomenclature, illustrative 1,3-diketone compounds that can be used in the stabilized vinyl chloride compositions of this invention include acetyl-hexanoyl-methane, acetyl-heptanoyl-methane, hexanol-propanoyl methane, acetyl-octadecanoyl-methane, acetyl-tetradecanoyl-methane, acetyl-dodecanoyl-methane, di-octadecanoyl-methane, butanoyl-octanoyl-methane, 1-acetyl-1-octanoyl-ethane, triacetylmethane, trihexanoylmethane, acetyl-benzoyl-methane, hexanoyl-benzoyl-methane, Octadecanoyl-benzoyl-methane, tetradecanoyl-benzoyl-methane, Dodecanoyl-benzoyl-methane, formyl-benzoyl-methane, heptanoyl-benzoyl-methane, acetyl-hexahydrobenzoylmethane, dibenzoylmethane, phenylacetyl-benzoyl-methane, benzoyl-nonylbenzoyl-methane, benzoylidacetyl-methane, di(hexahydrobenzoyl)methane, tribenzoylmethane, benzoyl-p-methoxybenzoyl-methane, di(p-methoxybenzoyl)methane, di(p-chlorobenzoyl)methane, di(3,4-methylenedioxbenzoyl)methane, 1-acetyl-1-benzoylnonane, alpha-acetyl-alpha-benzoyl-toluene, di(p-t-butylbenzoyl)methane, benzoyl-trifluoroacetyl-methane, diacetylmethane, acetyl-octanoyl-methane, and dipivaloylmethane.

Alkyl acid phosphates have 1 to 2 alkyl groups of 8 to 20 carbon atoms per phosphate ester group. Stearyl acid phosphate, di(2-ethylhexyl)acid phosphate, and dilauryl acid phosphate are representative.

Ether alcohol acid phosphate esters have 1 to 2 ether alcohol groups per phosphate ester group, and can be presented by a formula

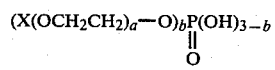

$$(X(OCH_2CH_2)_a{-}O)_b\overset{\|}{\underset{O}{P}}(OH)_{3-b}$$

where the number of ether groups in the ether alcohol represented by a is from 1 to about 22 and the number of ether alcohol groups represented by b is from 1 to 2, and X is a hydrocarbon group having 1 to about 20 carbon atoms. Commercial mixtures of homologous products, usually characterized by an average value of a, such as ethoxylated nonylphenol phosphate with average of 6 oxyethylene units or ethoxylated $C_{12}$–$C_{15}$ alkyl phosphate with average of 12 oxyethylene units are satisfactory.

Stabilizer compositions in accordance with this invention can be in solid, liquid or paste form. Liquid compositions can be prepared by blending the ingredients and heating at 40° to 200° C. for up to 6 hours to achieve visual homogeneity and storage stability. Inert ingredients that can be added to the stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate.

Following are the methods used in testing vinyl chloride polymer compositions containing stabilizer compositions according to this invention or control compositions used for comparison purposes.

Oven heat stability: Samples of each indicated formulation proportioned to 200 grams of vinyl chloride polymer are compounded on a two-roll mill until well mixed and removed in the form of sheets 1 mm in thickness. Strips cut from each sheet are exposed in an air circulating oven at the indicated temperature, and one strip of each formulation removed every five minutes and attached to a record card. Heat stability was recorded as the time in minutes to the first failure point represented by a deep orange, red, brown or black color.

Initial Color: This property is rated visually by comparing samples of each indicated formulation to a standard, to which is assigned the rating "medium". Unless otherwise indicated, the standard used is a sample of Control 1—1, e.g. the base formulation of Example 1 with 0.4 part barium stearate and 0.5 part zinc stearate as stabilizers. Initial color is rated by viewing samples against a white background.

Weatherability: Samples are exposed in a carbon arc accelerated weathering unit (Atlas Electric Devices Co. "Weatherometer") operated without water spray at 52° C. black panel temperature and 41°–44° C. air temperature. Samples are examined once daily for failure signs including spotting, uniform darkening, stiffening, and/or embrittlement, any one of which marks the failure of the sample. Weatherability is expressed in hours to such failure.

In the following Examples, which serve to illustrate the invention without limiting its scope, the metal compounds are chosen from environmentally acceptable zinc, barium and calcium salts and the ortho-phenylethylidene substituted phenyl hydrogen phosphites present in the respective vinyl chloride polymer samples are identified by the number under which they are referred to in Table 1. All parts are by weight.

EXAMPLES 1-1 TO 1-15

In order to examine the stabilizing effect of compositions of this invention, sheets 1 mm thick were prepared by mixing compounds having the formulation shown below on the two roll mill, and subjecting them to 175° C. oven heat stability, initial color, and Weather-O-Meter exposure tests. The results are shown in Table 2.

| (Formulation) | |
| --- | --- |
| PVC (Geon 103EP) | 100 parts by weight |
| dioctylphthalate | 48 |
| epoxidized soybean-oil | 2 |
| Ba—stearate | 0.4 |
| Zn—stearate | 0.5 |
| Substituted Phenyl phosphite (Table-2) | 0.3 |

TABLE - 2

| No. | PHOSPHITE Sample | Heat Stability min | Initial Color | Weather Resistance hrs |
| --- | --- | --- | --- | --- |
| Control | | | | |
| 1-1 | none | 45 | inferior | 600 |
| 1-2 | bis(nonylphenyl) phosphite | 45 | superior | 1,000 |
| 1-3 | bis(2,4-di-t-butylphenyl)phosphite | 60 | a little superior | 1,200 |
| Example | | | | |
| 1-1 | No. 2 (Table-1) | 105 | much superior | 2,500 |
| 1-2 | No. 4 (Table-1) | 105 | much superior | 2,200 |
| 1-3 | No. 6 (Table-1) | 120 | much superior | 2,400 |
| 1-4 | No. 7 (Table-1) | 105 | superior | 2,800 |
| 1-5 | No. 8 (Table-1) | 120 | superior | 2,600 |
| 1-6 | No. 10 (Table-1) | 120 | much superior | 2,600 |
| 1-7 | No. 14 (Table-1) | 105 | much superior | 2,500 |
| 1-8 | No. 15 (Table-1) | 105 | much superior | 2,500 |
| 1-9 | No. 18 (Table-1) | 120 | much superior | 2,200 |
| 1-10 | No. 20 (Table-1) | 120 | much superior | 2,400 |
| 1-11 | No. 21 (Table-1) | 120 | superior | 2,600 |
| 1-12 | No. 22 (Table-1) | 105 | much superior | 2,400 |
| 1-13 | No. 25 (Table-1) | 105 | much superior | 2,400 |
| 1-14 | No. 27 (Table-1) | 120 | much superior | 2,300 |
| 1-15 | No. 28 (Table-1) | 120 | much superior | 2,500 |

The results of these tests show the greatly enhanced effectiveness of the stabilizer compositions of this invention as compared to compositions lacking the essential ortho-phenylethylidene substituted phenyl hydrogen phosphite or containing in its place a different phenyl hydrogen phosphite not of this invention.

EXAMPLES 2-1 to 2-8

In order to examine the stabilizing effect of the compositions of this invention in rigid PVC compositions, samples were prepared and tested by the same procedure as in Example 1. The formulation was shown below and the results are shown in Table 3.

| (Formulation) | |
|---|---|
| PVC (Geon 103EP-8) | 100 parts by weight |
| epoxidized soybean-oil | 3.0 |
| Ca—stearate | 1.0 |
| Zn—stearate | 0.5 |
| BHT | 2.0 |
| stearic acid | 0.3 |
| tetratridecylbisphenol A-diphosphite | 0.3 |
| substituted phenyl phosphite (Table-3) | 0.25 |

TABLE - 3

| No. | PHOSPHITE Sample | Heat Stability min | Initial Color | Weather Resistance hrs |
|---|---|---|---|---|
| Control | | | | |
| 2-1 | none | 30 | inferior | 500 |
| 2-2 | diphenylphosphite | 30 | superior | 800 |
| 2-3 | bis(2-t-butyl-4-methylphenyl)phosphite | 45 | superior | 1,100 |
| Example | | | | |
| 2-1 | No. 1 (Table-1) | 105 | much superior | 1,800 |
| 2-2 | No. 2 (Table-1) | 105 | much superior | 1,800 |
| 2-3 | No. 5 (Table-1) | 90 | much superior | 1,600 |
| 2-4 | No. 9 (Table-1) | 105 | much superior | 1,600 |
| 2-5 | No. 17 (Table-1) | 90 | much superior | 1,800 |
| 2-6 | No. 23 (Table-1) | 90 | much superior | 1,900 |
| 2-7 | No. 26 (Table-1) | 105 | much superior | 1,600 |
| 2-8 | No. 27 (Table-1) | 105 | much superior | 1,600 |

The results of these tests show the dramatic effectiveness of the stabilizer compositions of this invention in rigid PVC in each property tested.

EXAMPLES 3-1 to 3-8

In order to examine the stabilizing effect of the compositions of this invention in a PVC-ABS blend, samples were prepared and tested by the same procedure as in Example 1.

The formulation was as shown below and the results are shown in Table-4.

| (Formulation) | |
|---|---|
| PVC (Geon 103EP-8) | 100 parts by weight |
| ABS (Blendex 11) | 10 |
| epoxidized soybean-oil | 3 |
| Ba—stearate | 0.8 |
| Zn-octoate | 0.5 |
| diisodecyl-phenylphosphite | 0.5 |
| stearic acid | 0.1 |
| substituted phenyl phosphite (Table-4) | 0.5 |

TABLE 4

| No. | PHOSPHITE Sample | Heat Stability min | Initial Color | Weather Resistance |
|---|---|---|---|---|
| Control | | | | |
| 3-1 | none | 80 | inferior | 1,000 |
| 3-2 | bis(nonylphenyl)phosphite | 90 | medium | 1,300 |
| Example | | | | |
| 3-1 | No. 1 (Table-1) | 110 | superior | 1,800 |
| 3-2 | No. 3 (Table-1) | 110 | superior | 1,600 |
| 3-3 | No. 6 (Table-1) | 120 | superior | 1,600 |
| 3-4 | No. 12 (Table-1) | 120 | superior | 1,600 |
| 3-5 | No. 13 (Table-1) | 110 | superior | 1,800 |
| 3-6 | No. 16 (Table-1) | 110 | superior | 1,800 |
| 3-7 | No. 20 (Table-1) | 110 | superior | 1,600 |
| 3-8 | No. 25 (Table-1) | 110 | superior | 1,600 |

The results of these tests demonstrate the excellent suitability of the compositions of this invention in this blend of vinyl chloride polymer and the greatly enhanced heat stability, initial color, and weather resistance as compared to the control compositions.

EXAMPLES 4-1 to 4-13

In order to examine the stabilizing effect of stabilizer compositions of this invention in the especially severe requirements presented by agricultural film compositions, samples were prepared and tested by the same procedure as in Example 1 using the following formulation. The results are shown in Table-5.

| (Formulation) | |
|---|---|
| PVC (Geon 103EP) | 100 parts by weight |
| DOP | 45 |
| trixylyl phosphate | 5 |
| epoxidized soybean-oil | 3 |
| bisphenol A-diglycidyl ether | 2 |
| Ba—stearate | 0.3 |
| Zn—stearate | 0.5 |
| diphenylisooctyl phosphite | 0.5 |
| sorbitanmonopalmitate (anti-fog agent) (Table-5) | 1.5 |
| substituted phenyl phosphite | 0.5 |

TABLE - 5

| No. | PHOSPHITE Sample | Heat Stability min | Initial Color | Weather Resistance hrs |
|---|---|---|---|---|
| Control | | | | |
| 4-1 | none | 90 | inferior | 600 |
| 4-2 | bis(2-t-butyl-4-methylphenyl)phosphite | 95 | a little superior | 1,100 |
| 4-3 | bis(2,4-di-t-butylphenyl)isodecyl phosphite | 105 | superior | 900 |
| Example | | | | |
| 4-1 | No. 4 (Table-1) | 145 | much superior | 3,100 |
| 4-2 | No. 5 (Table-1) | 145 | much superior | 3,000 |
| 4-3 | No. 8 (Table-1) | 135 | much superior | 3,100 |
| 4-4 | No. 11 (Table-1) | 145 | much superior | 2,800 |
| 4-5 | No. 12 (Table-1) | 150 | much superior | 3,000 |
| 4-6 | No. 13 (Table-1) | 150 | much superior | 2,800 |
| 4-7 | No. 15 (Table-1) | 145 | much superior | 2,800 |
| 4-8 | No. 19 (Table-1) | 150 | much superior | 2,900 |

TABLE - 5-continued

| No. | PHOSPHITE Sample | Heat Stability min | Initial Color | Weather Resistance hrs |
|---|---|---|---|---|
| 4-9 | No. 22 (Table-1) | 135 | much superior | 3,000 |
| 4-10 | No. 23 (Table-1) | 140 | much superior | 3,000 |
| 4-11 | No. 24 (Table-1) | 140 | much superior | 3,100 |
| 4-12 | No. 26 (Table-1) | 150 | much superior | 2,900 |
| 4-13 | No. 28 (Table-1) | 145 | much superior | 3,000 |

The remarkably enhanced heat stability, initial color, and particularly the weather resistance of the film compositions stablized according to this invention is evident from the results shown.

EXAMPLES 5-1 to 5-9

In order to examine the stabilizing effect of compositions of this invention in a vinyl chloride polymer containing auxiliary stabilizers, the following samples were prepared and tested as in Example 1 using the formulation below. The results are shown in Table-6.

| (Formulation) | |
|---|---|
| PVC (Geon 103EP) | 100 parts by weight |
| DOP | 48 |
| epoxidized soybean-oil | 2.0 |
| Ba—octoate | 0.3 |
| Ba—nonylphenol | 0.7 |
| Zn—p-t-butylbenzoate toluate | 0.4 |
| Stearic acid | 0.2 |
| tris(nonylphenyl) phosphite | 0.3 |
| 4-methyl-2(methylbenzyl)phenyl 2,4-di-t-butylphenyl phosphite (Table 1 compound No. 3) | 0.3 |
| Auxiliary stabilizer (Table 6) | 0.1 |

TABLE - 6

| No. | AUXILIARY Stabilizer | Heat Stability min | Initial Color | Weather Resistance hrs |
|---|---|---|---|---|
| Example | | | | |
| 5-1 | none | 105 | superior | 2,300 |
| 5-2 | pentaerythritol | 130 | superior | 2,500 |
| 5-3 | mannitol | 130 | superior | 2,500 |
| 5-4 | tris(2-hydroxyethyl) isocyanurate | 145 | much superior | 2,800 |
| 5-5 | dehydoacetic acid | 130 | superior | 2,600 |
| 5-6 | zinc dehydroacetate | 145 | superior | 2,600 |
| 5-7 | dibenzoylmethane | 130 | superior | 2,600 |
| 5-8 | dibenzoylmethane zinc salt | 130 | superior | 2,600 |
| 5-9 | thiodiethanolbis (aminocrotonate) | 145 | superior | 2,800 |

The results of this test series show that the interaction of stabilizer compositions of this invention with each of the auxiliary materials is favorable and results in further improvement of each property tested.

EXAMPLES 6-1 to 6-15

In order to examine the stabilizing effect of compositions of this invention in the absence of epoxide, sheets were prepared and tested by the same procedure as in Example 1. The formulation shown below is that of Examples 1-1 to 1-15 except that the epoxidized soybean oil has been omitted. The results are shown in Table-7.

| (Formulation) | |
|---|---|
| PVC (Geon 103EP) | 100 parts by weight |
| dioctylphthalate | 48 |
| Ba-stearate | 0.4 |
| Zn-stearate | 0.5 |
| Substituted phenyl phosphite (Table 7) | 0.3 |

| NO. | SUBSTITUTED PHENYL PHOSPHITE | HEAT STABILITY min. | INITIAL COLOR | WEATHER RESISTANCE hours |
|---|---|---|---|---|
| Control | | | | |
| 6-1 | none | 35 | inferior | 500 |
| 6-2 | bis-(nonylphenyl phosphite) | 35 | superior | 900 |
| 6-3 | bis-(2,4-di-t-butylphenyl) phosphite | 45 | a little superior | 1000 |
| Example | | | | |
| 6-1 | No. 2 (Table-1) | 90 | much superior | 2400 |
| 6-2 | No. 4 (Table-1) | 90 | much superior | 2100 |
| 6-3 | No. 6 (Table-1) | 110 | much superior | 2200 |
| 6-4 | No. 7 (Table-1) | 95 | superior | 2600 |
| 6.5 | No. 8 (Table-1) | 105 | superior | 2500 |
| 6-6 | No. 10 (Table-1) | 110 | much superior | 2500 |
| 6.7 | No. 14 (Table-1) | 95 | much superior | 2300 |
| 6-8 | No. 15 (Table-1) | 90 | much superior | 2300 |
| 6-9 | No. 18 (Table-1) | 110 | much superior | 2100 |
| 6-10 | No. 20 (Table-1) | 105 | much superior | 2200 |
| 6-11 | No. 21 (Table-1) | 105 | superior | 2500 |
| 6-12 | No. 22 (Table-1) | 95 | much superior | 2300 |
| 6-13 | No. 25 (Table-1) | 90 | much superior | 2200 |
| 6-14 | No. 27 (Table-1) | 110 | much superior | 2200 |
| 6-15 | No. 28 (Table-1) | 110 | much superior | 2300 |

The results of these tests parallel those of Examples 1-1 to 1-15 and show that the greatly enhanced effectiveness of the stabilizer compositions of this invention, as compared to compositions lacking the essential ortho-phenylethylidene substituted phenyl hydrogen phosphite or containing in its place a different phenyl hydrogen phosphite not of this invention, is independent of the presence or absence of epoxide.

EXAMPLES 7-1 to 7-8

In order to examine the stabilizing effect of the compositions of this invention in rigid PVC compositions in the absence of epoxide, samples were prepared and tested by the same procedure as in Example 1. The formulation shown below is that of Examples 2-1 to 2-8 except that the epoxidized soybean oil has been omitted. The results are shown in Table-8.

| (Formulation) | |
|---|---|
| PVC (Geon 103EP-8) | 100 parts by weight |
| Ca—stearate | 1.0 |
| Zn—stearate | 0.5 2.0 |
| stearic acid | 0.3 |
| tetratridecylbisphenol A-diphosphite | 0.3 |
| substituted phenyl phosphite (Table-8) | 0.25 |

TABLE - 8

| No. | Substituted Phenyl Phosphite | Heat Stability min | Initial Color | Weather Resistance hours |
|---|---|---|---|---|
| Control | | | | |
| 7-1 | none | 25 | inferior | 400 |
| 7-2 | diphenylphosphite | 25 | superior | 700 |
| 7-3 | bis-(2-t-butyl-4-methylphenyl)phosphite | 35 | | 900 |
| Example | | | | |
| 7-1 | No. 1 (Table-1) | 95 | much superior | 1600 |
| 7-2 | No. 2 (Table-1) | 90 | much superior | 1700 |
| 7-3 | No. 5 (Table-1) | 80 | much superior | 1500 |
| 7-4 | No. 9 (Table-1) | 95 | much superior | 1500 |
| 7-5 | No. 17 (Table-1) | 80 | much superior | 1700 |
| 7-6 | No. 23 (Table-1) | 80 | much superior | 1700 |
| 7-7 | No. 26 (Table-1) | 95 | much superior | 1400 |
| 7-8 | No. 27 (Table-1) | 90 | much superior | 1500 |

The results of these tests show that the dramatic effectiveness of the stabilizer compositions of this invention in rigid PVC on each property tested operates whether or not an epoxide is present.

We claim:

1. A stabilizer composition capable of enhancing the resistance to deterioration in color, clarity, and compatibility of a vinyl chloride polymer composition when heated at 175° C., comprising (A) at least one 6 to 30 carbon atoms phenol salt or 6 to 24 carbon atoms carboxylic acid salt of a polyvalent metal selected from the group consisting of magnesium, calcium, zinc, strontium, barium, cadmium, lead, stannous tin, and dialkyltin, and (B) per part of salt (A) from 0.1 to 10 parts of at least one hydrogen phosphite ester of an ortho-phenylethylidene-substituted phenol having the formula:

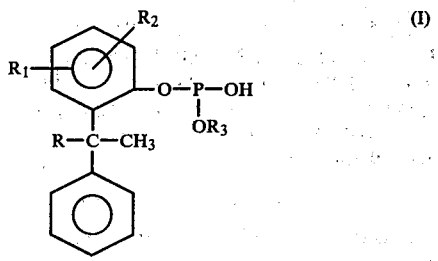

wherein:

R is hydrogen or methyl;

$R_1$ and $R_2$ are each selected from the group consisting of alkyl groups having from one to twenty carbon atoms; aryl groups having from six to eighteen carbon atoms; alkaryl and aralkyl groups having from seven to twenty-four carbon atoms; alkylene oxyalkyl groups having from three to forty carbon atoms and from one to twelve oxyether groups; and alkylene oxyaryl groups having from seven to forty-two carbon atoms and from one to twelve oxyether groups;

$R_3$ is selected from the group consisting of hydrogen; alkyl groups having from one to twenty carbon atoms; cycloalkyl having from five to twenty carbon atoms; aryl groups having from six to eighteen carbon atoms; alkaryl and aralkyl groups having from seven to twenty-four carbon atoms; alkylene oxyalkyl groups having from three to forty carbon atoms and from one to twelve oxyether groups; and alkylene oxyaryl groups having from seven to forty-two carbon atoms and from one to twelve oxyether groups.

2. A Stabilizer composition according to claim 1 in which the salt (A) is a zinc carboxylate.

3. A stabilizer composition according to claim 1 in which the salt (A) is a barium salt of a phenol.

4. A stabilizer composition according to claim 1 in which R is a methyl group.

5. A stabilizer composition according to claim 1 in which $R_1$ is a phenylethylidene group represented by the formula (II)

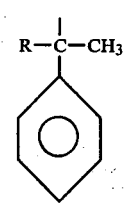

6. A stabilizer composition according to claim 1 in which $R_1$ and $R_2$ are hydrogen.

7. A stabilizer composition according to claim 1 in which $R_1$ is an alkyl group.

8. A stabilizer composition according to claim 1 in which $R_3$ is a phenylethylidene substituted phenyl group represented by formula (III).

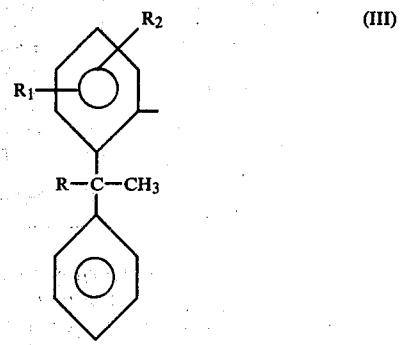

9. A stabilizer composition according to claim 1 in which $R_3$ is an alkyl group.

10. A stabilizer composition according to claim 1 in which $R_3$ is an ortho-alkylphenyl group.

11. A stabilizer composition according to claim 1 containing as an additional stabilizing ingredient at least one compound selected from the group consisting of 1,2-epoxides, organic phosphite triesters, phenols, aminocrotonate esters, aliphatic polyhydroxy compounds, ketoacetic acid compounds, and diacylmethanes.

12. A vinyl chloride polymer composition having enhanced resistance to deterioration in color, clarity, and compatibility when heated at 175° C., comprising a vinyl chloride polymer and per 100 parts by weight thereof 0.01 to 10 parts by weight of a stabilizer composition according to claim 1.

* * * * *